United States Patent
Yamamura et al.

(10) Patent No.: US 11,070,154 B2
(45) Date of Patent: Jul. 20, 2021

(54) ENGINE GENERATOR

(71) Applicant: HONDA MOTOR CO., LTD., Tokyo (JP)

(72) Inventors: Yoichi Yamamura, Wako (JP); Kyosuke Taniguchi, Wako (JP); Wataru Fukumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/884,277

(22) Filed: May 27, 2020

(65) Prior Publication Data
US 2020/0287489 A1    Sep. 10, 2020

Related U.S. Application Data

(63) Continuation of application No. PCT/JP2018/029159, filed on Aug. 3, 2018.

(30) Foreign Application Priority Data

Nov. 29, 2017  (JP) .............................. JP2017-229333

(51) Int. Cl.
*H02P 9/00*   (2006.01)
*F01B 23/10*  (2006.01)
(Continued)

(52) U.S. Cl.
CPC .............. *H02P 9/008* (2013.01); *F01B 23/10* (2013.01); *F02D 29/06* (2013.01); *F02D 43/00* (2013.01);
(Continued)

(58) Field of Classification Search
CPC .... H02P 5/15; H02P 9/008; H02P 9/04; H02P 2101/25; F02D 43/00; F02D 29/06; F01B 23/10
See application file for complete search history.

(56) References Cited

U.S. PATENT DOCUMENTS

2004/0008009 A1    1/2004  Fukaya
2020/0274375 A1*   8/2020  Griffiths ................ H02J 7/1423
(Continued)

FOREIGN PATENT DOCUMENTS

JP    9-177575 A    7/1997
JP    2002-54476 A  2/2002
(Continued)

OTHER PUBLICATIONS

International Search Report dated Oct. 23, 2018, issued in counterpart International Application No. PCT/JP2018/029159 (2 pages).

*Primary Examiner* — Pedro J Cuevas
(74) *Attorney, Agent, or Firm* — Westerman, Hattori, Daniels & Adrian, LLP

(57) ABSTRACT

A switch can connect or disconnect a generator and a supply unit. A control unit controls an engine in one of a plurality of control states including a power generation state, a first standby state and a second standby state. When an acceptance unit accepts a switching instruction from the first standby state to the second standby state, the control unit controls the switch to disconnect the generator and the supply unit, and reduces the engine speed of the engine from an engine speed in the first standby state to an engine speed in the second standby state.

14 Claims, 6 Drawing Sheets

(51) Int. Cl.
  *F02D 29/06*    (2006.01)
  *F02D 43/00*    (2006.01)
  *F02P 5/15*     (2006.01)
  *H02P 101/25*   (2016.01)
  *H02P 9/04*     (2006.01)

(52) U.S. Cl.
  CPC .................................... *F02P 5/15* (2013.01);
         *H02P 9/04* (2013.01); *H02P 2101/25*
                                            (2015.01)

(56) References Cited

U.S. PATENT DOCUMENTS

2020/0284211 A1* 9/2020 Yamamura ................ H02P 9/04
2020/0361281 A1* 11/2020 Williams ........... B60H 1/00885
2020/0362808 A1* 11/2020 Cosgrove ............ F02N 11/084
2020/0378352 A1* 12/2020 Cosgrove ........... B60H 1/00971
2021/0061279 A1* 3/2021 Nagata ................... H04W 4/40

FOREIGN PATENT DOCUMENTS

| JP | 2003-284258 A | 10/2003 |
| JP | 2004-218467 A | 8/2004 |
| JP | 2004-360610 A | 12/2004 |

\* cited by examiner

ENGINE GENERATOR

CROSS-REFERENCE TO RELATED APPLICATION(S)

This application is a continuation of International Patent Application No. PCT/JP2018/029159 filed on Aug. 3, 2018, which claims priority to and the benefit of Japanese Patent Application No. 2017-229333 filed on Nov. 29, 2017, the entire disclosures of which are incorporated herein by reference.

BACKGROUND OF THE INVENTION

Field of the Invention

The present invention relates to an engine generator.

Description of the Related Art

A portable generator including an internal combustion engine is used to supply power to an electric device at a construction site, an outdoor leisure, or a stall. In particular, in a portable generator that does not include a starting device such as a starter motor, a user needs to pull a recoil starter to start an engine. Pulling the recoil starter requires the user to do a certain amount of work. The user may find the work cumbersome. Hence, the user sometimes continues an idle operation without stopping the engine even if the engine generator is not supplying power to an external load.

In such a portable generator, even if no electric load is connected, the internal combustion engine consumes fuel, and noise is also generated. PTL 1 proposes a slow-down device that operates a solenoid in a no load state, and forcibly closes the throttle of a carburetor to a predetermined opening, thereby causing an engine to perform low-speed rotation. PTL 2 proposes turning on an economy control switch such that a throttle opening is set to a predetermined opening, an AC output current is decreased (light load), and an engine speed is reduced, thereby implementing low noise/low combustion.

PTL 1: Japanese Patent Laid-Open No. 9-177575
PTL 2: Japanese Patent Laid-Open No. 2003-284258

SUMMARY OF THE INVENTION

In general, an engine generator needs to maintain an engine speed to some degree to supply power to an external load immediately after an engine start. This is because if power supply to an external load is started when the engine is rotating at a low speed, the shaft output of the engine is insufficient, and the engine stalls (stops). Hence, in the inventions described in PTLs 1 and 2, the engine speed needs to be maintained to some degree so the engine does not stall even if an electric load is connected to an AC outlet. It is therefore an object of the present invention to provide an engine generator capable of further reducing fuel consumption and noise as compared to a conventional technique.

According to the present invention, for example, there is provided an engine generator comprising: an engine; a generator driven by the engine to generate power; a supply unit configured to supply the power generated by the generator to an external load; a switch configured to connect or disconnect the generator and the supply unit; a control unit configured to control the engine in one of a plurality of control states including a power generation state in which the generator and the supply unit are connected by the switch, and an engine speed, an air fuel ratio, and an advance of an ignition timing are controlled in accordance with the external load, a first standby state in which the generator and the supply unit are connected by the switch, and power is not supplied to the external load, and a second standby state in which the generator and the supply unit are disconnected by the switch; an acceptance unit configured to accept a switching instruction between the first standby state and the second standby state, wherein when the acceptance unit accepts a switching instruction from the first standby state to the second standby state, the control unit controls the switch to disconnect the generator and the supply unit, and reduces the engine speed of the engine from an engine speed in the first standby state to an engine speed in the second standby state.

According to the present invention, since a switch configured to disconnect a supply unit such as an AC outlet and a generator is provided, the load on the engine is not increased only by connecting the plug of an external load to the supply unit, and the engine hardly stalls. For this reason, the engine speed in a standby state can be reduced as compared to a conventional technique, and fuel consumption and noise can be reduced.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

Figure 1:
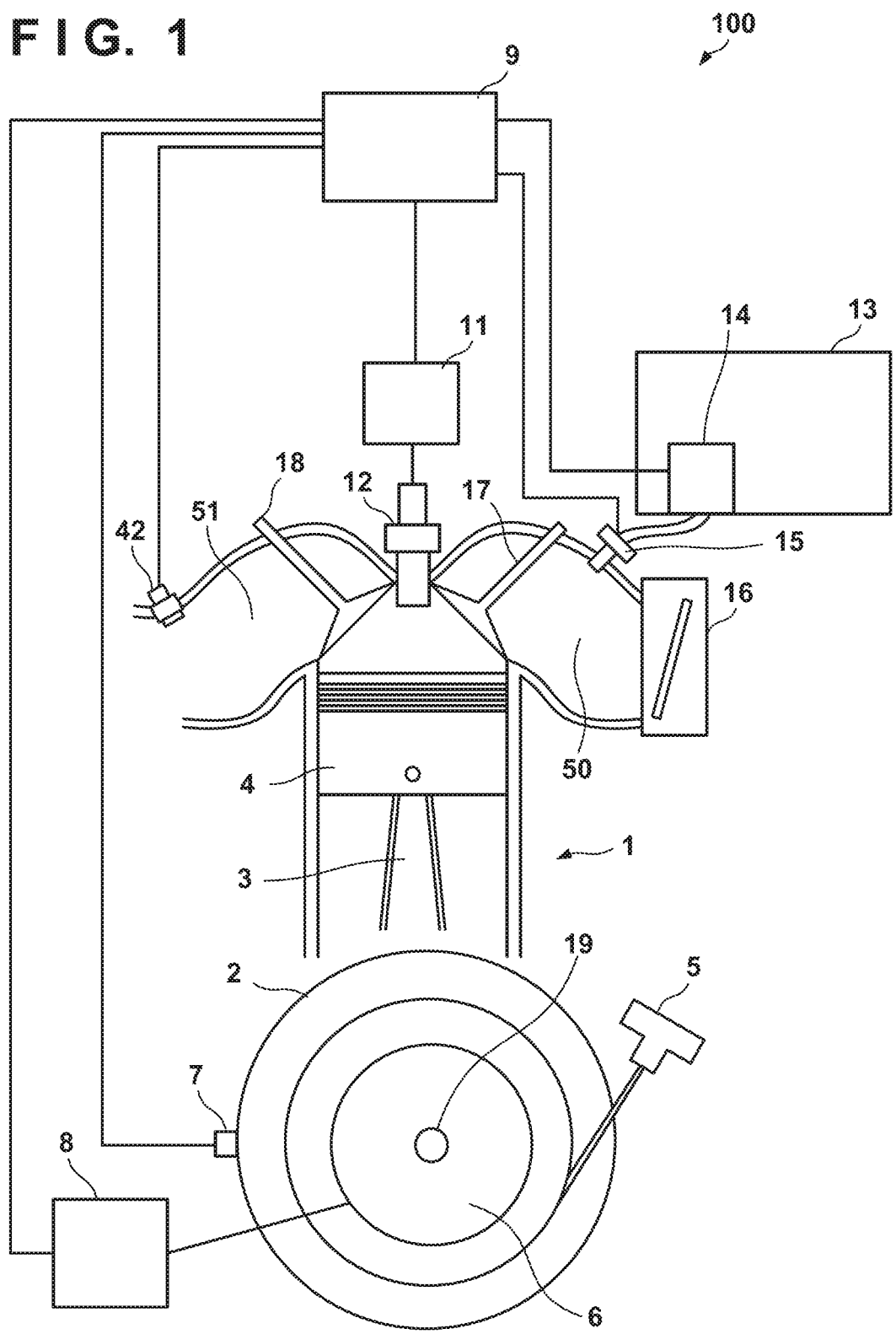
FIG. 1 is a schematic view showing an engine system.

<Engine System>
FIG. 1 is a schematic view showing an engine system 100. The engine system 100 may be called an electronically controlled fuel injection control system. An internal combustion engine 1 is a 4-stroke engine. A crankshaft 19 is stored in a crankcase 2. When the crankshaft 19 rotates, a piston 4 connected to a connecting rod 3 moves in the vertical direction in a cylinder. A recoil starter 5 used to start the internal combustion engine 1 is connected to the crankshaft 19. A recoil operator grasps and pulls the handle of the recoil starter 5, thereby rotating the crankshaft 19. A generator 6 is connected to the crankshaft 19. When the crankshaft 19 rotates, the rotor of the generator 6 rotates and generates power. The crank angle of the crankshaft 19 is detected by a crank angle sensor 7. The crank angle sensor 7 may be, for example, a Hall element configured to detect the magnetism of a magnet provided on a flywheel connected to the crankshaft 19. The detection result of the crank angle sensor 7 may be used to calculate the engine speed. A power supply circuit 8 includes an inverter that converts an AC generated by the generator 6 into an AC of a predetermined frequency, a circuit that converts the AC into a DC, a circuit that converts the level of the DC voltage, and the like. The power supply circuit 8 supplies the power generated by the generator 6 to a control unit 9. Note that when the crankshaft 19 is rotated by the recoil starter 5, the generator 6 generates sufficient power for the control unit 9 to operate. The control unit 9 is an engine control unit (ECU) and controls the power supplied from the power supply circuit 8 to an ignition device 11, a fuel pump 14, an injector 15, a throttle motor 16, and the like. The ignition device 11 supplies ignition power to cause a spark plug 12 to cause spark discharge. A fuel tank 13 is a container that stores fuel. The fuel pump 14 is a pump that supplies fuel stored in the fuel tank 13 to the injector 15. Referring to FIG. 1, the fuel pump 14 is provided in the fuel tank. The throttle motor 16 is a motor configured to control the inflow amount of air flowing into the cylinder via an intake path 50. An intake valve 17 is a valve to be opened/closed by a cam configured to convert the rotary motion of the crankshaft 19 into a vertical motion, and the like. The intake valve 17 is opened in an intake stroke and is basically closed in a compression stroke, an expansion stroke, and an exhaust stroke. An exhaust valve 18 is a valve to be opened/closed by a cam configured to convert the rotary motion of the crankshaft 19 into a vertical motion, and the like. The exhaust valve 18 is opened in the exhaust stroke and is basically closed in the compression stroke, the expansion stroke, and the intake stroke. For smooth transition from exhaust to intake, a period in which the intake valve 17 and the exhaust valve 18 are simultaneously opened may be provided (overlap). An O2 sensor 42 is a sensor that detects an oxygen concentration in an exhaust gas discharged from the cylinder to an exhaust path 51.

<Control Unit and Power Supply Circuit>

Figure 2:
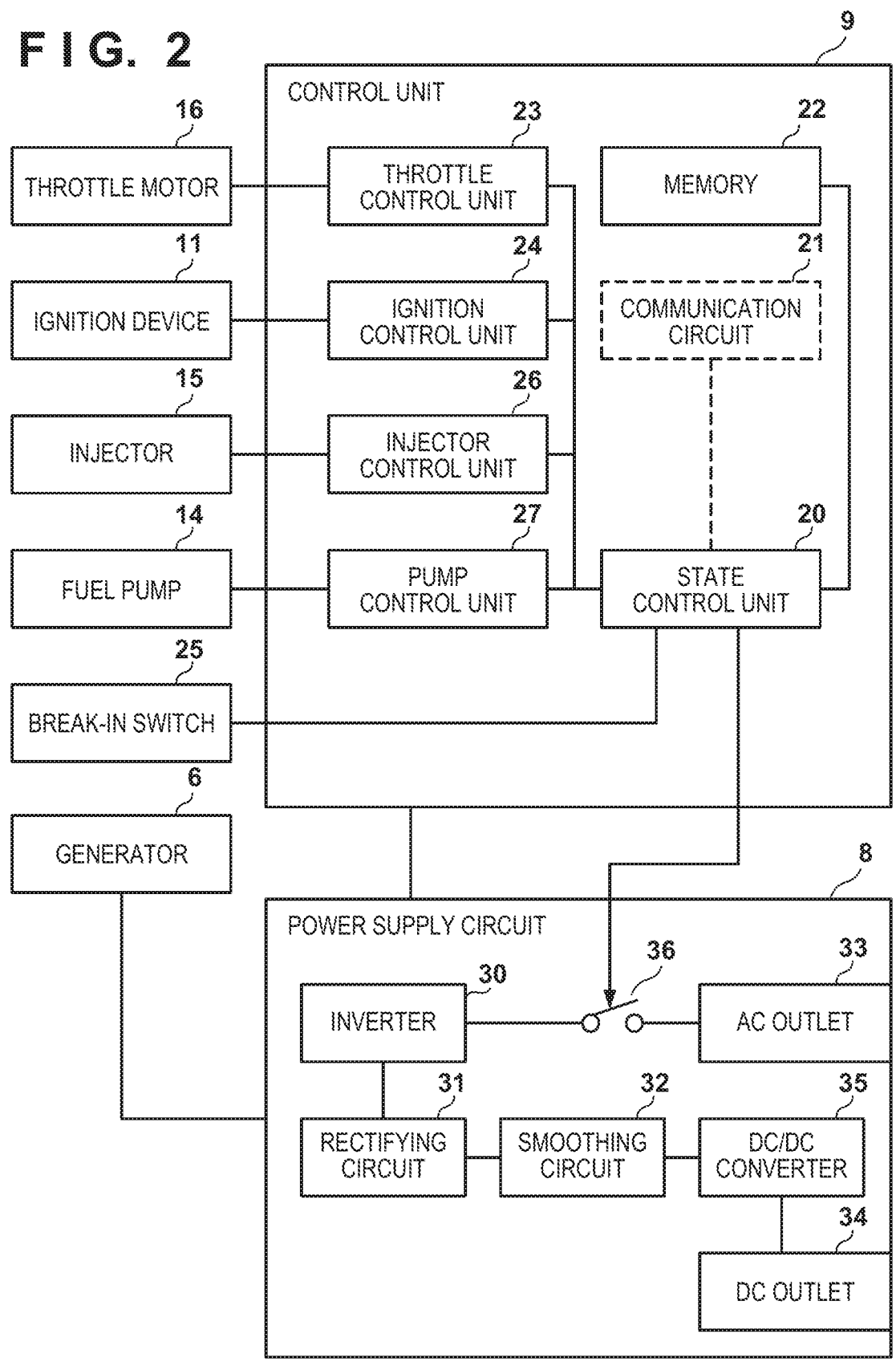
FIG. 2 is a block diagram showing a control unit and a power supply circuit.

FIG. 2 shows the function of the control unit 9 and the function of the power supply circuit 8. A state control unit 20 controls the operation state of the internal combustion engine 1. The state control unit 20 controls the throttle motor 16 via a throttle control unit 23 to adjust the inflow amount of air. The engine speed is thus controlled. The state control unit 20 controls the ignition device 11 via an ignition control unit 24. The ignition control unit 24 adjusts the advance of the ignition timing based on the detection result of the crank angle sensor 7. The state control unit 20 decides a target air fuel ratio in accordance with the temperature of the internal combustion engine 1, the load of the generator 6, ON/OFF of a break-in switch 25, and the like. Also, the state control unit 20 converts the detection result of the O2 sensor 42 into an air fuel ratio, drives the fuel pump 14 via a pump control unit 27, and adjusts the supply amount of fuel such that the air fuel ratio becomes the target air fuel ratio. In addition, the state control unit 20 discriminates the engine stroke based on the detection result of the crank angle sensor 7, and controls the injection timing of the injector 15 via an injector control unit 26 in accordance with the engine stroke. The break-in switch 25 is a switch configured to switch an idle state. In this embodiment, there are an idle state (first standby state) in which power can be supplied to an external load, and an idle state (second standby state) in which power is not supplied to an external load. The state control unit 20 selects an idle state in accordance with a break-in instruction input from the break-in switch 25 or a break-in instruction received from a remote controller, a smartphone, or the like via a communication circuit 21.

In the power supply circuit 8, an inverter 30 is a conversion circuit that converts an AC generated by the generator 6 into an AC of a predetermined frequency. A rectifying circuit 31 is a circuit that rectifies the AC generated by the AC generated by the generator 6. A smoothing circuit 32 is a circuit that generates a DC by smoothing a pulsating current generated by the rectifying circuit 31. Accordingly, a DC voltage of, for example, 12 V is generated. The control unit 9 may PWM-control the power supplied to the fuel pump 14 in accordance with the load of the generator 6 or the internal combustion engine 1. A DC/DC converter 35 is a circuit that converts the level of the DC voltage. For example, the DC/DC converter 35 converts the DC voltage of 12 V into a DC voltage of 5 V or 3.3 V. The DC/DC converter 35 supplies the DC voltage from a DC outlet 34 to an external load.

The inverter 30 supplies an AC voltage to an external load via the AC outlet 33. In particular, a switch 36 to be turned on/off by the state control unit 20 is provided between the inverter 30 and the AC outlet 33. The switch 36 may be a semiconductor switch, a relay circuit, or the like. The state control unit 20 switches the state of the switch 36 in accordance with the state of the break-in switch 25. In particular, if the break-in switch 25 is OFF, the state control unit 20 controls the switch 36 to ON. Power can thus be supplied to an external load connected to the AC outlet 33. On the other hand, if the break-in switch 25 is ON, the state control unit 20 controls the switch 36 to OFF. This makes it impossible to supply power to an external load connected to the AC outlet 33. Furthermore, the state control unit 20 controls the rotation speed of the internal combustion engine 1 to such a rotation speed that prevents stall even if the external load requests power in the first standby state. On the other hand, in the second standby state, power is not supplied to the external load. Hence, the state control unit 20 maintains the rotation speed of the internal combustion engine 1 to a rotation speed as low as possible at which the internal combustion engine 1 can perform self-sustaining rotation. This makes it possible to reduce the rotation speed in the idle state as compared to a conventional technique and reduce fuel consumption and noise.

Figure 3:
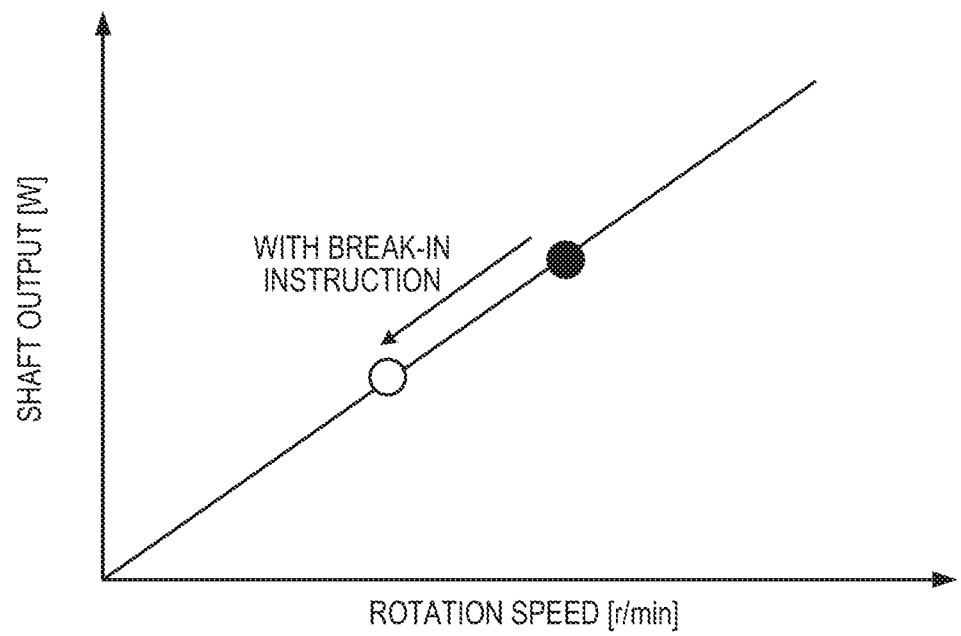
FIG. 3 is a graph showing the relationship between a rotation speed and a shaft output.
Figure 4:
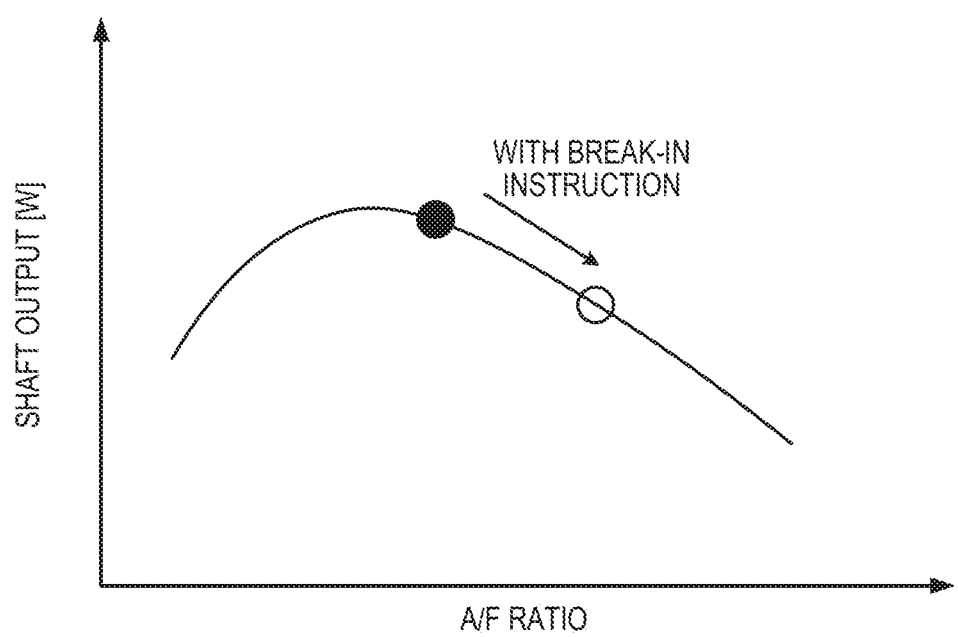
FIG. 4 is a graph showing the relationship between an A/F ratio and a shaft output.

As shown in FIG. 3, if a break-in instruction is accepted via the break-in switch 25 or the communication circuit 21, the state control unit 20 reduces the rotation speed. Similarly, as shown in FIG. 4, if a break-in instruction is accepted via the break-in switch 25 or the communication circuit 21, the state control unit 20 raises the A/F ratio (air fuel ratio). When the air fuel ratio is raised, fuel consumption is suppressed.

Figure 5:
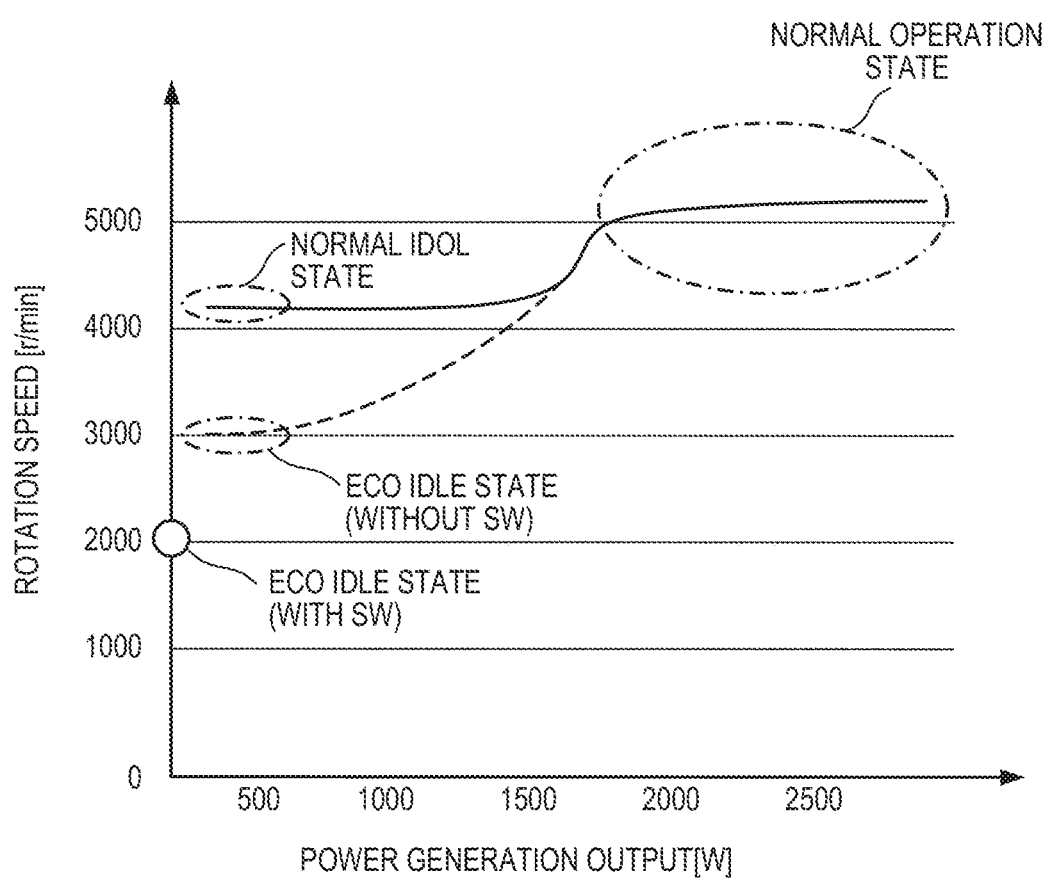
FIG. 5 is a graph showing the relationship between a power generation output and a rotation speed.

FIG. 5 is a graph for explaining the relationship between a power generation output and a rotation speed. In a normal idle state, a normal idle rotation speed (e.g., 4,300 r/min) is selected such that when an external load as a rated output of the generator 6 is connected to the AC outlet 33, the rated output can be supplied immediately. Note that an idle rotation speed in an eco idle state (without SW) for fuel saving or noise reduction is, for example, 3,000 r/min. "Without SW" means that the switch 36 is not provided. If the switch 36 is not provided, the internal combustion engine 1 may stall when an external load is suddenly connected. To prevent the stall, the idle rotation speed needs to be set to, for example, 3,000 r/min. When the AC outlet 33 and the generator 6 are disconnected by the switch 36, the idle rotation speed in the eco idle state (with SW) can be reduced to, for example, 2,000 r/min. The eco idle state (with SW) may be called a break-in operation state.

Note that even if the break-in switch 25 is switched from ON to OFF (that is, even if break-in cancel is instructed), the state control unit 20 does not immediately switch the switch 36 from OFF to ON. If the switch 36 is immediately switched to ON, the internal combustion engine 1 stalls due to the external load connected to the AC outlet 33. For this reason, the state control unit 20 waits until the rotation speed of the internal combustion engine 1 recovers to such a rotation speed that does not cause stall of the internal combustion engine 1 even if power is supplied to the external load, and then switches the switch 36 from OFF to ON.

In FIG. 2, a memory 22 includes a ROM and a RAM. The memory 22 may store a set of control parameters for each of the operation states (a normal operation state, the normal idle state (first standby state), and the break-in operation state (second standby state)) of the internal combustion engine 1. The control parameters can include an engine speed, an air fuel ratio, the advance of an ignition timing, and the like. The normal operation state is an operation state in which the generator 6 and the AC outlet 33 are connected by the switch 36, and the engine speed, the air fuel ratio, and the advance of the ignition timing are controlled in accordance with an external load. The normal idle state is the first standby state in which the generator 6 and the AC outlet 33 are connected by the switch 36, and power is not supplied to the external load. The break-in operation state is the second standby state in which the generator 6 and the AC outlet 33 are disconnected by the switch 36, and power cannot be supplied to the external load. The state control unit 20 reads out the control parameters from the memory 22 in accordance with each operation state, and controls the internal combustion engine 1 in accordance with the readout control parameters and the detection results of various kinds of sensors.

<Flowchart>

Break-in Transition

Figure 6:
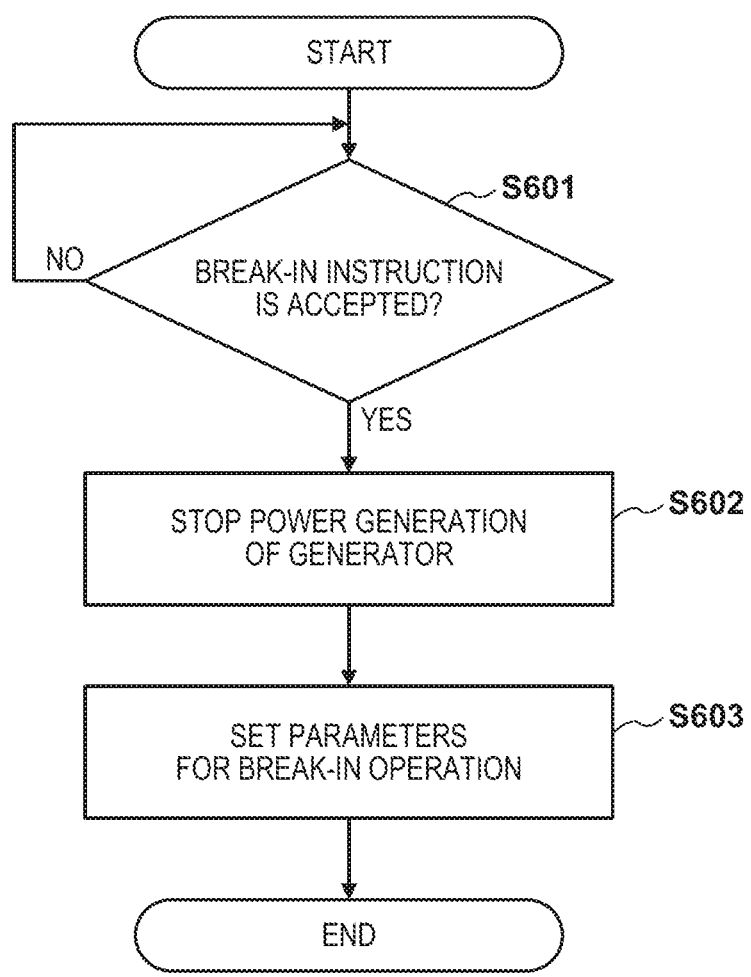
FIG. 6 is a flowchart for explaining a transition method of a break-in operation state.

FIG. 6 shows a method of making transition from a normal operation state to a break-in operation state. It is assumed here that the internal combustion engine 1 is operating in a normal idle state or a normal operation state.

In step S601, the state control unit 20 determines whether a break-in instruction is accepted. If a break-in instruction is accepted via the break-in switch 25 or the communication circuit 21, the state control unit 20 advances to step S602.

In step S602, the state control unit 20 stops power generation of the generator 6. Strictly, the generator 6 and the AC outlet 33 are disconnected. The state control unit 20 switches the switch 36 to OFF, thereby disconnecting the generator 6 and the AC outlet 33. A DC output for the external load may also be stopped. That is, the generator 6 and the power supply circuit 8 may generate only power needed for an internal load such as the control unit 9. Note that if a battery or the like is provided, and power can be supplied from the battery to an internal load such as the control unit 9, the generator 6 may be stopped.

In step S603, to transition the operation state of the internal combustion engine 1 to the break-in operation state, the state control unit 20 sets the control parameters for the break-in operation, which are read out from the memory 22, in the throttle control unit 23, the ignition control unit 24, the pump control unit 27, and the like. That is, the rotation speed for the break-in operation is set in the throttle control unit 23. The advance for the break-in operation is set in the ignition control unit 24. The A/F ratio or fuel supply amount (fuel injection amount) for the break-in operation is set in the pump control unit 27. The internal combustion engine 1 thus transitions to the break-in operation state.

Break-in Return

Figure 7:
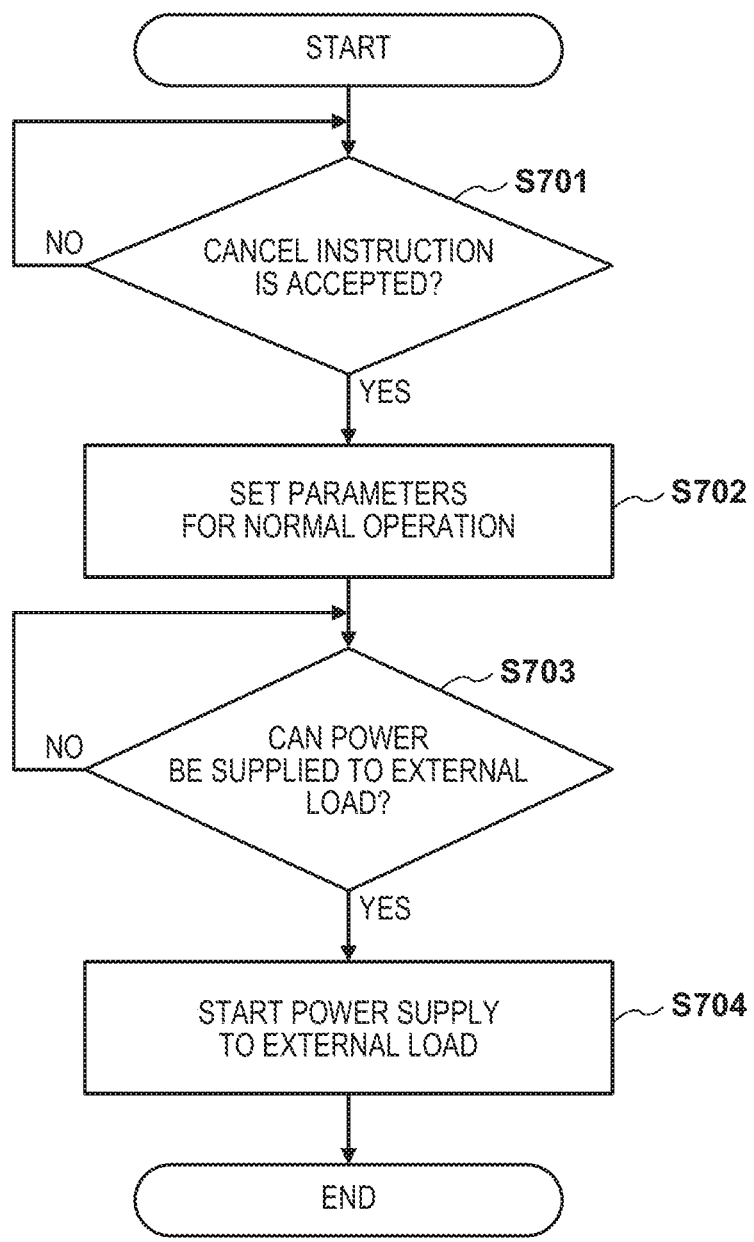
FIG. 7 is a flowchart for explaining a cancel method of a break-in operation state.

FIG. 7 shows a method of returning from a break-in operation state.

In step S701, the state control unit 20 determines whether a break-in cancel instruction is accepted. If a break-in cancel instruction is accepted via the break-in switch 25 or the communication circuit 21, the state control unit 20 advances to step S702. The break-in cancel instruction may be, for example, switching the break-in switch 25 from ON to OFF.

In step S702, the state control unit 20 reads out the control parameters for the normal operation from the memory 22, and sets them in the throttle control unit 23, the ignition control unit 24, the pump control unit 27, and the like.

In step S703, the state control unit 20 determines whether power can be supplied to the external load. For example, if the engine speed is equal to or more than a predetermined threshold, the state control unit 20 determines that power can be supplied to the external load. If the engine speed is less than a predetermined threshold, the state control unit 20 determines that power cannot be supplied to the external load. If the internal combustion engine 1 can supply power to the external load, the state control unit 20 advances to step S704.

In step S704, the state control unit 20 switches the switch 36 from OFF to ON, thereby starting power supply to the external load. More strictly, if the external load is not connected to the AC outlet 33, the internal combustion engine 1 maintains the normal idle state. On the other hand, if the external load is connected to the AC outlet 33, the internal combustion engine 1 transitions to the normal operation state.

SUMMARY

According to the present invention, the engine generator includes the internal combustion engine 1, the generator 6 driven by the internal combustion engine 1 to generate power, a supply unit (AC outlet 33) configured to supply the power generated by the generator 6 to an external load, the switch 36 configured to connect or disconnect the generator 6 and the AC outlet 33, and the control unit 9. The normal operation state is an example of a power generation state in which the generator 6 and the AC outlet 33 are connected by the switch 36, and the engine speed, the air fuel ratio, and the advance of the ignition timing are controlled in accordance with the external load. The normal idle state is an example of a first standby state in which the generator 6 and the AC outlet 33 are connected by the switch 36, and power is not supplied to the external load. Note that the first standby state may be understood as a state in which power is not supplied to the external load in the normal operation state. The eco idle state (with SW) is an example of a second standby state in which the generator 6 and the AC outlet 33 are disconnected by the switch 36. The control unit 9 controls the internal combustion engine 1 in one of the plurality of control states. The break-in switch 25 or the communication circuit 21 is an example of an acceptance unit configured to accept a switching instruction between the first standby state (or the normal operation state) and the second standby state. When the acceptance unit accepts a switching instruction from the first standby state to the second standby state, the control unit 9 controls the switch 36 to disconnect the generator 6 and the supply unit. In addition, the control unit 9 reduces the engine speed of the internal combustion engine 1 from an engine speed (e.g., 4,300 r/min) in the first standby state to an engine speed (e.g., 2,000 r/min) in the second standby state. According to this embodiment, since the switch 36 configured to disconnect the supply unit such as the AC outlet 33 and the generator 6 is provided, the load on the internal combustion engine 1 is not increased only by connecting the plug of the external load to the supply unit, and the internal combustion engine 1 hardly stalls. For this reason, the engine speed in the standby state can be reduced as compared to a conventional technique, and fuel consumption and noise can be reduced.

The rotation speed in the second standby state is a rotation speed (e.g., 2,000 r/min) at which the internal combustion engine 1 does not stall in a state in which the power is not supplied to the external load.

The rotation speed in the first standby state is a rotation speed (e.g., 4,300 r/min) at which the internal combustion engine 1 does not stall in a state in which an external load equal to a rated load of the generator 6 is connected to the supply unit. When the acceptance unit accepts the switching instruction from the first standby state to the second standby state, the control unit 9 may decrease the advance of the ignition timing of the internal combustion engine 1. To reduce the rotation speed, the throttle opening is set small. However, if the throttle opening is too small, the controllability of the rotation speed lowers. Hence, when the ignition timing is delayed, it is possible to readily set a relatively large opening of the throttle, improve the throttle resolution, and readily ensure the controllability of the rotation speed.

When the acceptance unit accepts the switching instruction from the first standby state to the second standby state, the control unit 9 raises the air fuel ratio of the internal combustion engine 1. Since this decreases fuel in a mixer, fuel consumption is reduced.

When the acceptance unit accepts the switching instruction (break-in cancel instruction) from the second standby state to the first standby state, the control unit 9 transitions the control state of the internal combustion engine 1 from the second standby state to the first standby state. This makes it possible to supply power to the external load.

When the transition from the second standby state to the first standby state is completed, the control unit 9 connects the generator 6 and the supply unit by the switch 36. If a large external load is connected during the transition from the second standby state to the first standby state, the internal combustion engine 1 may stall. In particular, the closer the rotation speed in the second standby state is to a lower limit value at which the internal combustion engine 1 can perform self-sustaining rotation, the more readily the internal combustion engine 1 stalls. For this reason, the control unit 9 waits for recovery of the rotation speed of the internal combustion engine 1, and then switches the switch 36 to ON. This makes it possible to set a low rotation speed in the second standby state and suppress the stall of the internal combustion engine 1 during the transition.

The engine system 100 may further include the recoil starter 5 configured to start the internal combustion engine 1. In the engine system 100 including the recoil starter 5 in place of a starter motor, the user is forced to do a work when restarting the internal combustion engine 1. The user who feels this cumbersome sometimes continues operating the internal combustion engine 1 in the normal idle state without stopping the internal combustion engine 1. Hence, in the internal combustion engine 1 to be started by the recoil starter 5, the above-described embodiment is advantageous.

The acceptance unit may include the communication circuit 21 that is a receiver configured to accept an instruction transmitted from a remote controller or a communication device. This allows the user to easily transition the internal combustion engine 1 to the break-in operation state or transition the internal combustion engine 1 from the break-in operation state to the normal operation state even at a position apart from the engine system 100.

The break-in switch 25 is an example of a switch configured to switch between the first standby state and the second standby state. The break-in switch 25 configured to switch between the first standby state and the second standby state may be provided in the outlet receptacle (AC outlet 33) of the supply unit. In this case, the break-in switch 25 is turned on/off in accordance with insertion/removal of an outlet plug into/from the outlet receptacle. The user can switch between the first standby state and the second standby state by inserting/removing the plug.

An acceptance circuit configured to accept a break-in cancel instruction may be added. Such an acceptance circuit may include a voltage source configured to apply a weak voltage across the live terminal and the neutral terminal of the AC outlet 33, a current detection circuit configured to detect the current flowing across the live terminal and the neutral terminal and output the detected voltage, and a determination circuit configured to determine whether the detected voltage is equal to or more than a threshold voltage. When an external load is connected, a weak current flows across the live terminal and the neutral terminal. Hence, the detected voltage becomes equal to or more than the threshold voltage, and the determination circuit outputs a high-level detection signal. Note that when the level of the detection signal changes from low level to high level, the control unit 9 determines that an external load is connected to the AC outlet 33, cancels break-in, and switches the control state of the internal combustion engine 1 from the second standby state to the first standby state. Note that when the level of the detection signal changes from low level to high level, the control unit 9 may stop the supply of the weak current by the voltage source.

The internal combustion engine 1 includes a throttle (throttle motor 16) configured to control the inflow amounts of air and fuel to the internal combustion engine 1. The control unit 9 adjusts the throttle, thereby controlling the rotation speed. The internal combustion engine 1 may further include the injector 15 and the fuel pump 14, which function as a fuel injection device. The control unit 9 adjusts the injection amount of fuel in the fuel injection device, thereby controlling the air fuel ratio of the internal combustion engine 1. The internal combustion engine 1 may further include the crank angle sensor 7 configured to detect a crank angle. The control unit 9 decides the ignition timing based on the crank angle detected by the crank angle sensor 7. In addition, the control unit 9 adjusts the advance of the ignition timing in accordance with the control state of the internal combustion engine 1.

The present invention is not limited to the above embodiments, and various changes and modifications can be made within the spirit and scope of the present invention. Therefore, to apprise the public of the scope of the present invention, the following claims are made.

What is claimed is:

1. An engine generator comprising:
   an engine;
   a generator driven by the engine to generate power;
   a supply unit configured to supply the power generated by the generator to an external load;

a switch configured to connect or disconnect the generator and the supply unit;

a control unit configured to control the engine in one of a plurality of control states including a power generation state in which the generator and the supply unit are connected by the switch, and an engine speed, an air fuel ratio, and an advance of an ignition timing are controlled in accordance with the external load, a first standby state in which the generator and the supply unit are connected by the switch, and power is not supplied to the external load, and a second standby state in which the generator and the supply unit are disconnected by the switch;

an acceptance unit configured to accept a switching instruction between the first standby state and the second standby state, wherein when the acceptance unit accepts a switching instruction from the first standby state to the second standby state, the control unit controls the switch to disconnect the generator and the supply unit, and reduces the engine speed of the engine from an engine speed in the first standby state to an engine speed in the second standby state.

2. The engine generator according to claim 1, wherein engine speed in the second standby state is an engine speed at which the engine does not stall in a state in which the power is not supplied to the external load.

3. The engine generator according to claim 2, wherein the engine speed in the first standby state is an engine speed at which the engine does not stall in a state in which an external load equal to a rated load of the generator is connected to the supply unit.

4. The engine generator according to claim 1, wherein when the acceptance unit accepts the switching instruction from the first standby state to the second standby state, the control unit decreases the advance of the ignition timing of the engine.

5. The engine generator according to claim 1, wherein when the acceptance unit accepts the switching instruction from the first standby state to the second standby state, the control unit raises the air fuel ratio of the engine.

6. The engine generator according to claim 1, wherein when the acceptance unit accepts the switching instruction from the second standby state to the first standby state, the control unit transitions the control state of the engine from the second standby state to the first standby state.

7. The engine generator according to claim 6, wherein when the transition from the second standby state to the first standby state is completed, the control unit connects the generator and the supply unit by the switch.

8. The engine generator according to claim 1, further comprising a recoil starter configured to start the engine.

9. The engine generator according to claim 1, wherein the acceptance unit includes a receiver configured to accept an instruction transmitted from one of a remote controller and a communication device.

10. The engine generator according to claim 1, wherein the acceptance unit includes a switch configured to switch between the first standby state and the second standby state.

11. The engine generator according to claim 10, wherein the switch configured to switch between the first standby state and the second standby state is a switch provided in an outlet receptacle of the supply unit and turned on/off in accordance with insertion/removal of an outlet plug into/from the outlet receptacle.

12. The engine generator according to claim 1, wherein the engine includes a throttle configured to control inflow amounts of air and fuel to the engine, and the control unit adjusts the throttle, thereby controlling the engine speed.

13. The engine generator according to claim 1, wherein the engine further includes a fuel injection device, and the control unit adjusts an injection amount of fuel in the fuel injection device, thereby controlling the air fuel ratio of the engine.

14. The engine generator according to claim 1, wherein the engine further includes a crank angle sensor configured to detect a crank angle, and the control unit decides the ignition timing based on the crank angle detected by the crank angle sensor, and adjusts the advance of the ignition timing in accordance with the control state of the engine.

* * * * *